United States Patent [19]

Saito et al.

[11] Patent Number: 4,946,893

[45] Date of Patent: Aug. 7, 1990

[54] METHOD FOR PREPARING FILLED SILICONE RUBBER PARTICLES

[75] Inventors: Masayuki Saito; Keiji Yoshida, both of Ichihara; Mitsuo Hamada, Kisarazu, all of Japan

[73] Assignee: Dow Corning Toray Silicone Company Limited, Tokyo, Japan

[21] Appl. No.: 275,498

[22] Filed: Nov. 23, 1988

[30] Foreign Application Priority Data

Nov. 30, 1987 [JP] Japan .................................. 62-302149

[51] Int. Cl.$^5$ ............................................. C08L 83/07
[52] U.S. Cl. ..................................... 524/862; 524/731; 524/785; 524/837; 528/15; 528/31; 528/32
[58] Field of Search ............... 524/785, 837, 731, 268, 524/861, 862; 528/15, 31, 32

[56] References Cited

U.S. PATENT DOCUMENTS

| | | | |
|---|---|---|---|
| 4,544,696 | 10/1985 | Streusand | 524/428 |
| 4,743,670 | 5/1988 | Yoshida et al. | 528/15 |
| 4,749,765 | 6/1988 | Shimuzu | 528/15 |
| 4,761,454 | 8/1988 | Oba | 524/862 |

FOREIGN PATENT DOCUMENTS

2129820 5/1984 United Kingdom .

*Primary Examiner*—John C. Bleutge
*Assistant Examiner*—R. Dean, Jr.
*Attorney, Agent, or Firm*—Robert Spector

[57] ABSTRACT

Cured silicone rubber powder containing large amounts of particulate material formed by dispersing a liquid silicone rubber composition curable by a platinum-catalyzed hydrosilation reaction into water. The presence of a low molecular weight, volatile polydiorganosiloxane makes it possible to incorporate at least 100 parts by weight of particulate material per 100 parts of curable polydiorganosiloxane into the composition. The volatile polydiorganosiloxane is removed from the cured polwder. Finely divided magnetic metals, electrically conductive materials and reinforcing silica powders can be incorporated using the present method.

3 Claims, No Drawings

METHOD FOR PREPARING FILLED SILICONE RUBBER PARTICLES

BACKGROUND OF THE INVENTION

1. Field of the Invention

The present invention relates to a method for preparing finely divided silicone rubber particles. In particular, this invention relates to a method for preparing a finely divided silicone rubber powder containing large amounts of various types of particulate additives such as magnetic metal powders, electrically conductive powders, and reinforcing silica fillers.

2. Description of the Prior Art

The preparation of spherical silicone rubber particles by dripping a low-viscosity liquid silicone rubber composition is dripped under free-fall conditions quiescent water curing the resultant dripped-in material is taught in Japanese unexamined published application (Kokai) Number 61-223032 [223,032/86]).

However, because this method does not allow the incorporation into the liquid silicone rubber composition of large quantities of the various types of particulate additives which are used to provide silicone rubbers with particular physical properties, the problem arises that one cannot obtain silicone rubber particles having special capabilities or an excellent mechanical strength.

U.S. Pat. No. 4,749,765 which issued on Aug. 11, 1987 to one of the three inventors named on the present application and one other, and is assigned to the same assignee as the present application, teaches a method for preparing cured silicone rubber in the form of a powder by spraying the ingredients of a heat-curable silicone rubber composition into air heated to a temperature of from 80° to 200° C.

U.S. Pat. No. 4,743,670, which issued on May 10, 1988 to two of the three inventors named on the present application and one other and is assigned to the same assignee teaches a method for preparing a cured silicone rubber powder by dispersing a heatcurable liquid silicone rubber composition into water at a temperature of from 0°–25° C. and then dispersing this dispersion into water heated to a temperature above 25° C. to form the cured silicone rubber powder.

None of the aforementioned methods are capable of forming a powdered form of silicone rubber containing 100 parts by weight or more per 100 parts of curable liquid silicone rubber composition of a particulate additive such as a metal powder or a reinforcing fillers.

SUMMARY OF THE INVENTION

The object of the present invention is to provide a method for incorporating large quantities of a particulate material into a powdered form of silicone rubber of uniform particle size.

DETAILED DESCRIPTION OF THE INVENTION

The present invention provides an improved method for preparing a highly filled silicone rubber powder, said process comprising the following steps:

The present invention provides an improved method for preparing a highly filled silicone rubber powder, said process comprising the following steps:

I. dispersing into water maintained at a temperature of at least 25° C. a liquid silicone rubber composition comprising (A) 100 weight parts of an organopolysiloxane having at least 2 lower alkenyl groups in each molecule, (B) an organohydrogenpolysiloxane having at least 3 silicon-bonded hydrogen atoms, where said composition contains from 0.5 to 20 moles of silicon-bonded hydrogen atoms per mole of alkenyl radicals in said polyorganosiloxane, (C) an amount of a platinum compound equivalent to from 0.1 to 1,000 parts by weight of said metal per 1,000,000 parts of combined weight of ingredients (A) and (B), and (D) a microparticulate powder having an average particle diameter not exceeding 20 micrometers, and II. recovering said composition from said water in the form of a cured silicone rubber powder.

The improvement comprises (1) the addition to said liquid silicone rubber composition of (a) from 20 to 2,000 weight parts of an unreactive, volatile diorganopolysiloxane having a degree of polymerization not exceeding 10, and (b) from 100 to 1000 parts by weight of said microparticulate powder per 100 parts of said organopolysiloxane and (2) subsequently drying the resultant cured powder to remove said diorganopolysiloxane.

The inventive feature of the present method is the presence in the curable liquid silicone rubber composition of a volatile, low molecular weight unreactive polydiorganosiloxane, referred to hereinafter as ingredient E. This ingredient permits the incorporation of an amount of particulate material that is at least equal in weight to the weight of the alkenyl-substituted organopolysiloxane identified herein as ingredient A.

Ingredient A of the present curable liquid silicone rubber compositions cures by an addition reaction with ingredient B under the catalytic activity of ingredient C. Ingredient A must contain at least 2 lower alkenyl groups in each molecule. These lower alkenyl group are exemplified by but not limited to vinyl. allyl, and propenyl groups. While the lower alkenyl groups may be present anywhere in the organopolysiloxane molecule, it is preferred that at least one be present at the molecular terminals.

The molecular configuration of ingredient A can be linear, cyclic, branch-containing linear, or network however a straight chain, either without branching or with only slight branching, is preferred.

No specific restriction is placed on the molecular weight of this component, however the viscosity at 25 degrees Centigrade is preferably at least 100 centipoise in order to obtain an elastomeric cured product. Examples of ingredient A include but are not limited to methylvinylpolysiloxanes, methylvinylsiloxane-dimethylsiloxane copolymers, dimethylvinylsiloxy-terminated dimethylpolysiloxanes, dimethylvinylsiloxy-terminated dimethylsiloxanemethylphenylsiloxane copolymers, dimethylvinylsiloxy-terminated dimethylsiloxane-diphenylsiloxane-methylvinylsiloxane copolymers, trimethylsiloxy-terminated dimethylsiloxanemethylphenylsiloxane-methylvinylsiloxane copolymers, dimethylvinylsiloxy-terminated methyl(3,3,3-trifluoropropyl)polysiloxanes, dimethylvinylsiloxy-terminated dimethylsiloxanemethyl(3,3,3-trifluoropropyl)siloxane copolymers, and polysiloxanes consisting essentially of the $CH_2=CH(CH_3)_2SiO_{1/8}$ unit, $(CH_3)_3SiO_{1/8}$ unit, and $SiO_{4/2}$ unit.

Ingredient B used in the present invention is a crosslinker for ingredient A. Curing of the liquid silicone rubber composition proceeds by an addition reaction between the silicon-bonded hydrogen atoms of ingredient B and the lower alkenyl groups in ingredient A under the catalytic action of a platinum catalyst referred to hereinafter as ingredient C. Ingredient B must contain at least 3 silicon-bonded hydrogen atoms in each molecule in order to function as a crosslinker.

No specific restriction is placed on the molecular configuration of ingredient B. This ingredient can be linear branch-containing linear or cyclic. Furthermore, while the molecular weight of this ingredient is also not specifically restricted, viscosities of 1 to 50,000 centipoise at 25 degrees Centigrade are preferred in order to obtain a good miscibility with ingredient A.

Ingredient B is present in an amount equivalent to from 0.5 to 20 silicon-bonded hydrogen atoms per ethylenically unsaturated group present in ingredient A. Preferably the concentration of ingredient B is equivalent to from 1.05 to 5 silicon-bonded hydrogen atoms per alkenyl group.

Ingredient C of the present compositions is a curing catalyst for the addition reaction between silicon-bonded hydrogen atoms and alkenyl groups.

Examples of ingredient C include but are not limited to chloroplatinic acid, chloroplatinic acid dissolved in an alcohol or ketone, and complex compounds between chloroplatinic acid and olefins.

Ingredient C is present in amount equivalent from 0.1 to 1,000 weight parts of platinum metal per 1,000,000 weight parts of the total quantity of ingredients A and B. The crosslinking reaction does not proceed adequately at less than 0.1 weight part, while exceeding 1,000 weight parts is uneconomical. In typical cases, an amount of ingredient C equivalent to from 1 to 100 weight parts as platinum metal is preferred.

The microparticulate powder comprising ingredient D of the present compositions provides the silicone rubber powder with various physical properties such as, for example, magnetic properties, electrical conductivity, and enhanced mechanical properties such as compressive strength. Ingredient D is exemplified but not limited to magnetic metal powders such as iron powder, cobalt powder nickel powder, and iron oxide powder; electrically conductive powders such as carbon black; and reinforcing fillers such as silica quartz, and diatomaceous earth.

The concentration of ingredient D is from 100 to 1,000 weight parts per 100 parts of ingredient A. a range of from 200 to 700 weight parts being preferred.

The volatile unreactive diorganopolysiloxane comprising ingredient E of the present compositions functions as a diluent that permits blending large quantities of the microparticulate powder, ingredient D, into the curable compositions of this invention. The degree of polymerization exhibited by ingredient E must not exceed 10, and preferably does not exceed 8. The organic groups in this diorganopolysiloxane are exemplified by but not limited to alkyl groups such as methyl, ethyl, propyl and octyl; aryl groups such as phenyl; and haloalkyl groups such as 3,3,3-trifluoropropyl. The preferred organic group is methyl Ingredient E is exemplified by but not limited to cyclic dimethylpolysiloxanes corresponding to the general formula

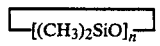

where n is an integer with a value of 4 to 10 and linear dimethylpolysiloxanes corresponding to the general formula

where m is an integer with a value of 1 to 10.

Octamethylcyclotetrasiloxane and decamethylcyclopentasiloxane are particularly suitable embodiments of ingredient E.

Ingredient E does not react with ingredients A or B and is present in the present curable liquid organosiloxane compositions within the range of 20 to 2,000 weight parts per 100 weight parts of ingredient A. At below 20 weight parts, the object of the present invention cannot be achieved namely the improvement in the various physical properties of the cured silicone rubber powder based on a large content of ingredient D. On the other hand, more than 2,000 parts by weight of ingredient E causes a decline in the physical properties of the silicone rubber powder, and also is uneconomical.

Furthermore insofar as the object of the present invention is not compromised the organopolysiloxane composition used in the present invention may contain small or trace quantities of acetylenic compounds, hydrazines, triazoles, phosphines mercaptans, or other known platinum catalyst inhibitors as additives to inhibit the curing reaction.

While the curable liquid silicone compositions used to obtain the silicone rubber powder of this invention can be obtained by simply mixing the aforementioned ingredients A through E using some general mixing means, it is preferred that the liquid silicone composition be prepared as described in the aforementioned U.S. Pat. No. 4,749,765 by mixing the components A through E at a temperature of from minus 60 degrees Centigrade to plus 5 degrees Centigrade and that the resultant composition be stored under these same temperature conditions. The disclosure of this patent is incorporated herein by reference.

The organopolysiloxane comprising ingredient A will gel at below minus 60 degrees Centigrade, and the addition reaction between ingredients A and B will occur during mixing and/or storage at temperatures in excess of plus 5 degrees Centigrade. Either of these effects will causes problems in the dripping, pouring, or strand-form extrusion of the liquid silicone rubber composition with the result that a silicone rubber particulate with a uniform particle diameter cannot be obtained.

Water is used as the medium to disperse and cure the liquid silicone rubber composition in addition to dispersing the cured silicone rubber powder. The curable composition can be dispersed in the water by allowing the composition to drip in, by pouring it in or extruding it in the form of a strand.

A surfactant may be used in order to disperse the cured silicone rubber powder homogeneously. Surfactants useful in this application include the nonionic and anionic surfactants and emulsifying agents known in the art as useful for the formation of aqueous silicone emulsions. While there is no specific restriction on the type of surfactant, surfactants should be avoided which contain an atom which would cause a loss in the catalytic activity of ingredient C and thereby inhibit curing of the silicone rubber composition.

The temperature of the water into which the liquid silicone rubber composition is dispersed is preferably at least 25 degrees Centigrade and more preferably at least 50 degrees Centigrade in order to promote curing or crosslinking of the liquid silicone rubber composition.

A number of methods exist for the pouring or strand-form extrusion of the liquid silicone rubber composition into the water. In one method, the liquid silicone rubber composition is placed in a container equipped with a spout, and is continuously poured from this spout into the water under free-fall conditions, either in the form of a strand or thin film. In another method, the liquid silicone rubber composition is placed in an extrusion device equipped with a fine-bore nozzle, and is continuously extruded in strand form through this nozzle into the water. From the standpoint of productivity, it will be advantageous to carry out a continuous pouring or strand-form extrusion of the liquid silicone rubber composition into water set in motion by stirring or other suitable means.

The intensity of stirring will vary with the quantity and curing rate of the poured or strand-form extruded liquid silicone rubber composition, and thus is not specifically restricted. The rate of stirring should generate a minimum flow rate of 0.1 cm/second. Otherwise the poured or strand-form extruded silicone rubber composition will not be separated and fragmented by the flow of the stirred liquid and continuous connections may be present. There will then be a tendency to obtain a silicone molding connected into a strand rather than in particulate form. Furthermore, while the flow direction is not specifically restricted, flow in a constant direction is preferred. Concrete examples of useful type of flow include horizontal flow (flow in the horizontal direction), rotating flow (concentric rotating flow toward the center), and falling flow (flow from a higher point to a lower point).

During the second step of the present method ingredient E, the volatile, unreactive diorganopolysiloxane is removed from the silicone rubber powder obtained in the first step of the method. In general, when large quantities of ingredient E remain in the cured silicone rubber powder, the powder is swelled and the mechanical strength is reduced; furthermore, the surface will be tacky and will bind dust. Thus, removal o most of ingredient E is essential. The extent to which ingredient E must be removed cannot be strictly specified because it will vary with the end use application of the cured silicone rubber powder. In any event, the concentration of ingredient E remaining on the powder should be less than 1% by weight.

Ingredient E is easily removed by placing the cured silicone rubber powder in a suitable drier such as a vacuum drier or oven and exposing the powder to temperatures of from room temperature to 400 degrees Centigrade under ambient or reduced pressures.

EXAMPLES

The following examples are intended to describe preferred embodiment of the present invention and should not be interpreted as limiting the scope of the invention as defined in the accompanying claims. Unless otherwise specified all parts and percentages specified in the examples are by weight and viscosities were measured at 25 degrees C.

Example 1

A liquid silicone rubber composition was prepared by mixing 100 parts dimethylvinylsiloxy-terminated dimethylpolysiloxane exhibiting a viscosity of 500 centipoise (0.5 Pa.s), and a vinyl group content of 0.5% (ingredient A), 200 parts magnetic iron oxide powder ($Fe_3O_4$, average particle diameter = 3 micrometers), 300 parts octamethylcyclotetrasiloxane, 5 parts of a trimethylsiloxy-terminated methylhydrogenpolysiloxane exhibiting a viscosity of 5 centipoise and a silicon-bonded hydrogen atom content of 0.8%, and 0.6 parts of a 3% solution of chloroplatinic acid in isopropanol.

Water was placed in a container with a homomixer installed at the center, the temperature was adjusted to 80 degrees Centigrade, and the mixer was activated.

The liquid silicone rubber composition described in the first section of this example was placed in a container maintained at zero degrees Centigrade and equipped with a spout at the bottom, and was poured into the container of water through this spout. The stream fragmented above the water surface, and was dispersed and cured in the water. The cured product was removed from the water, and then heated for 3 hours in an oven maintained at 150 degrees Centigrade. Inspection of the resulting cured silicone rubber powder using a scanning electron microscope revealed the average particle diameter to be 18 micrometers and the magnetic iron oxide powder to be located in the interior of the particles.

Analysis of the powder revealed a concentration of octamethylcyclotetrasiloxane of less than 0.5 weight %.

Example 2

A curable liquid silicone rubber composition of this invention was prepared by mixing 100 parts dimethylvinylsiloxy-terminated dimethylpolysiloxane exhibiting a viscosity of 500 centipoise (0.5 Pa.s), and a vinyl group content of 0.5%, 400 parts nickel powder with a particle diameter of 3 micrometers, 300 parts octamethylcyclotetrasiloxane, 6 parts trimethylsiloxy-terminated methylhydrogenpolysiloxane exhibiting a viscosity of 10 centipoise (0.01 Pa.s) and a silicon-bonded hydrogen atom content of 1.0%, and 0.6 parts of a 3% solution of chloroplatinic acid in isopropanol.

The liquid silicone rubber composition was placed in a extruder equipped with a nozzle and adjusted to maintain a temperature of minus 5 degrees Centigrade. The composition was extruded through the nozzle into a container of water as described in Example 1. The strand-form extruded liquid silicone rubber composition was fragmented and cured in the water and thus converted into a powder. The cured product was removed from the water container placed in a vacuum oven, and dried at 120 degrees Centigrade in vacuo. Inspection of the obtained silicone rubber particulate with a scanning electron microscope revealed a silicone rubber powder particulate with an average particle diameter of 20 micrometers and containing the nickel powder in its interior.

Example 3

A liquid silicone rubber composition was prepared by mixing 100 parts dimethylvinylsiloxy-terminated dimethylpolysiloxane exhibiting a viscosity of 500 centipoise and a vinyl group content of 0.5%, 500 parts copper oxide power with a particle diameter of 5 micrometers, 400 parts octamethylcyclotetrasiloxane, 6 parts of a trimethylsiloxy-terminated methylhydrogenpolysiloxane exhibiting a viscosity of 10 centipoise (0.01 Pa.s) and a silicon-bonded hydrogen atom content of 1.0%, and 0.6 parts of a 3 weight percent solution of chloroplatinic acid in isopropanol.

This silicone rubber composition was placed in a nozzle-equipped extruder adjusted to maintain a temperature of minus 5 degrees Centigrade. The composition was extruded in strand form through the nozzle into water at 80 degrees Centigrade. The water was flowing horizontally at a rate of 20 cm/second. The strand-form extruded liquid silicone rubber composition was fragmented, dispersed, and cured in the water.

The cured product was removed, placed in an oven adjusted to 150 degrees Centigrade, and heated for 3 hours. Examination of the cured product under a scanning electron microscope revealed a silicone rubber powder with a particle diameter of 20 micrometers which contained the copper oxide powder.

Comparison Example 1

A silicone rubber composition was prepared as in Example 1, but omitting the octamethylcyclotetrasiloxane. The resultant liquid silicone rubber composition was almost immobile, and could not be continuously poured into the water container.

That which is claimed is:

1. In a method for preparing a highly filled silicone rubber powder, said method comprising I. dispersing into water maintained at a temperature of at least 25° C. a liquid silicone rubber composition comprising (A) 100 weight parts of an organopolysiloxane having at least 2 lower alkenyl groups in each molecule, (B) an organohydrogenpolysiloxane having at least 3 siliconbonded hydrogen atoms, where the said composition contains from 0.5 to 20 moles of siliconbonded hydrogen atoms for each mole of lower alkenyl groups in said organopolysiloxane, (C) an amount of a platinum compound equivalent to from 0.1 to 1,000 parts by weight of platinum per 1,000,000 parts of combined weight of ingredients (A) and (B), and (D) a microparticulate powder having an average particle diameter not exceeding 20 micrometers, and II. recovering said composition from said water in the form of a cured silicone rubber powder, the improvement comprising (1) the addition to said liquid silicone rubber composition of (a) from 20 to 2,000 weight parts of an unreactive, volatile diorganopolysiloxane having a degree of polymerization not exceeding 10 and (b) from 100 to 1000 parts by weight of said microparticulate powder per 100 parts of said organopolysiloxane and (2) subsequently drying said cured powder to remove said diorganopolysiloxane.

2. A method according to claim 1 where the concentration of said organohydrogensiloxane is equivalent to from 1.05 to 5 siliconbonded hydrogen atoms per alkenyl group, the concentration of said platinum compound is equivalent to from 1 to 100 parts by weight of platinum per million parts of the combined weight of said organopolysiloxane and said organohydrogensiloxane, the concentration of said microparticulate powder is from 200 to 700 parts by weight per 100 parts of said organopolysiloxane, the water into which said curable composition is dispersed contains a surfactant and the temperature of said water is at least 50° C., and said water is set in motion to provide a flow rate of at least 0.1 cm./second.

3. A method according to claim 1 where the alkenyl groups of said organopolysiloxane are vinyl and the remaining organic groups are methyl or a combination of methyl with either phenyl or 3,3,3trifluoropropyl, the organic groups of said organohydrogensiloxane are methyl or a combination of methyl with either phenyl or 3,3,3trifluoropropyl, said unreactive diorganopolysiloxane is a cyclic or linear dimethylpolysiloxane, said platinum compound is chloroplatinic acid, a solution of chloroplatinic acid in an alcohol or ketone or a complex of chloroplatinic acid and an olefin, and said microparticulate powder is a magnetic metal powder, an electrically conductive powder or a reinforcing filler.

* * * * *